United States Patent Office 3,546,943
Patented Dec. 15, 1970

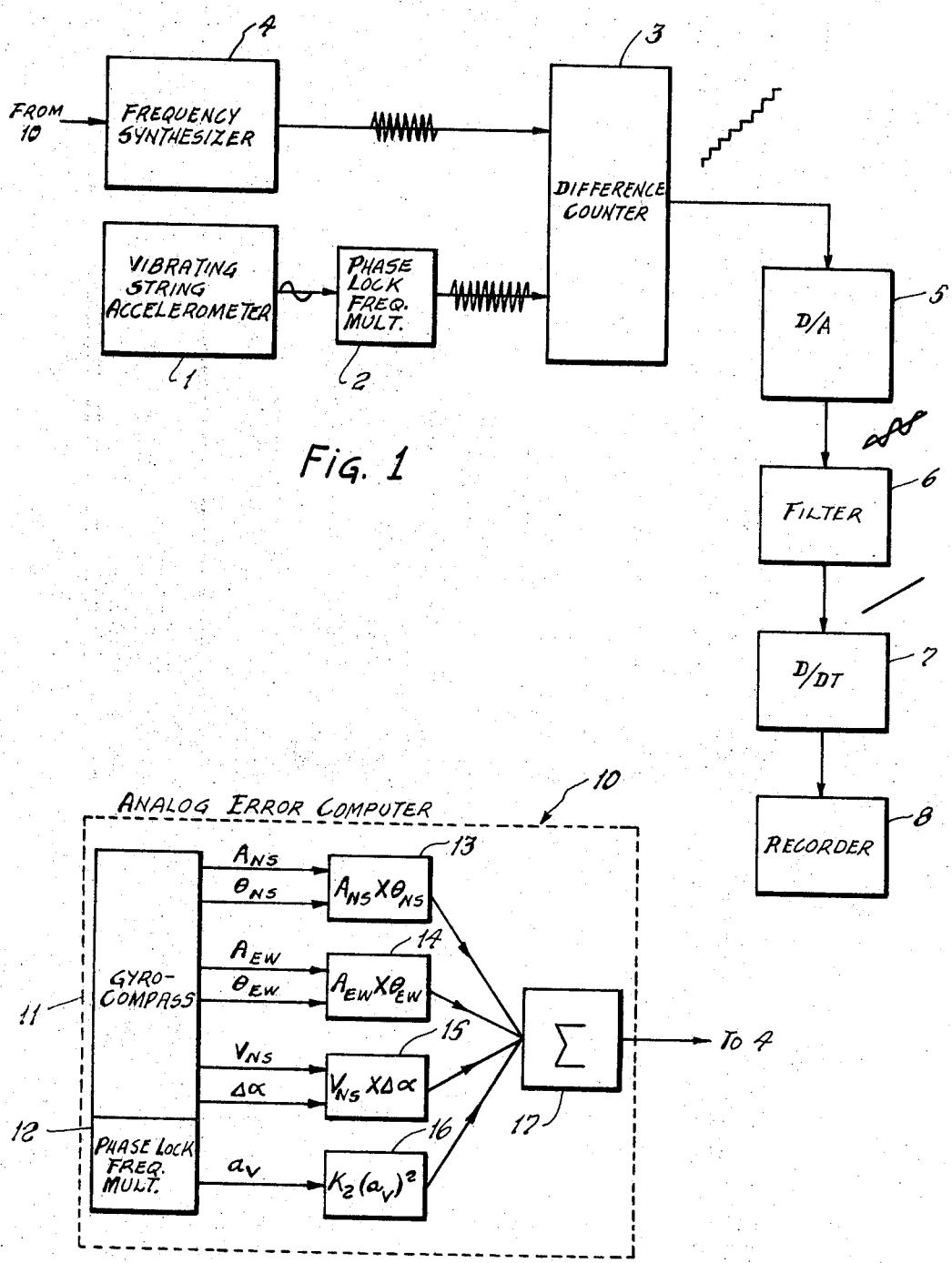

3,546,943
SEA GRAVIMETER
Charles G. Wing, Brighton, Mass., assignor, by mesne assignments, to the United States of America as represented by the Secretary of the Navy
Filed May 3, 1968, Ser. No. 726,294
Int. Cl. G01v 7/16
U.S. Cl. 73—382        5 Claims

ABSTRACT OF THE DISCLOSURE

This invention provides a method for accurately determining the local gravitational field at sea. This local field is measured by indirectly determining the mean frequency of the output of a vibrating string accelerometer. This indirect measurement is obtained by heterodyning the output of the accelerometer with a local oscillator whose output frequency is made to closely approximate that output of the accelerometer. The mean difference signal generated by this heterodyning process represents the difference in frequency between these signals caused only by the local gravitational field. This difference signal when further processed and added to the local oscillator frequency is the mean frequency of the accelerometer. From this indirectly derived mean frequency the local gravitational field may be obtained.

---

The invention described herein may be manufactured and used by or for the Government of the United States of America for governmental purposes without the payment of any royalties thereon or therefor.

This invention relates to the measurement of local gravitational fields by shipborne or airborne gravimeters and, more specifically, to a method of processing the output of an accelerometer to obtain its mean frequency and thus the value of the local gravitational field. Accurate measurement of local gravitational fields has become of increasing importance in such fields as geophysical prospecting and inertial navigation. Studies are currently underway to determine the figure of the earth at sea, the physical departure of the sea surface from a geoid and the recognition of subsurface structures. All of these studies require accurate measurement of local gravitational fields at sea.

A number of gravity meters have been developed which provide measurement of the local gravitational acceleration. One of the most successful of these gravimeters utilizes a vibrating string accelerometer which produces a sinusoidal output whose frequency is directly proportional to the local gravitational field.

When the gravimeters are used at sea, they require a stabilized platform for isolating them against pitch and roll effects due to the movement of the ship. While gyrocontrolled systems have been devised to stabilize the accelerometer platform, errors due to these ship movements, as well as nonlinearities in the accelerometer itself, still persist to degrade the system. In addition, the large vertical acceleration signals due to the heave of the ship must be removed. One way to remove heave is by a digital averaging technique. However, this technique requires either large capacity counters to hold all of the averaged bits or complex computing equipment.

The present invention is directed to a method of processing signals from both the accelerometer and the gyro control system so as to eliminate all of the above sources of error without the need for onboard computer facilities or high capacity counters. The value of the local gravitational field is derived by heterodyning the outputs of an accelerometer and a local oscillator tuned to the approximate mean frequency of the accelerometer. The difference between these heterodyned signals is accumulated in a counter and, this difference, expressed digitally, is then converted to an analog signal which is filtered, differentiated and recorded as the frequency difference between the two signals due only to the local acceleration of gravity. When this frequency difference is added to the frequency of the local oscillator, the mean frequency of the accelerometer is obtained. From this mean frequency, the local gravitational field may be accurately computed. Because it is the difference and not the sum that is digitally counted, high capacity counters are not necessary.

By proper shifting of the frequency of the voltage-controlled local oscillator, off-leveling, fishtail and non-linear rectification errors may be removed in real time from the system. In addition to the frequency adjustment of the local oscillator, proper filtering of the analog signal removes the error due to vertical accelerations caused by ship heave.

It is therefore an object of this invention to provide a method for processing gravimeter signals so as to eliminate errors caused by nongravitational accelerations.

It is another object of this invention to provide means for processing gravimeter signals so as to eliminate errors due to nonlinearities in the accelerometer.

It is a further object of this invention to provide a method for determining the mean frequency of an accelerometer subject to both gravitational and nongravitational accelerations.

Other objects, advantages and novel features of the invention will become apparent from the following detailed description thereof when considered in conjunction with the accompanying drawings in which like numerals represent like parts throughout and wherein:

FIG. 1 is a schematic diagram of the gravimeter signal processing system having an accelerometer and a local oscillator; and FIG. 2 is a detailed schematic diagram of the analog error computer which controls the local oscillator of FIG. 1.

In general, seagoing gravimeters are mounted on gyro-stabilized platforms which are secured to the deck of a ship. In the present invention, the accelerometer is mounted directly on the phantom assembly of a gyrocompass such that the vertical axis of the gyrocompass and the vertical axis of the accelerometer coincide with the local vertical. This mounting provides a convenient method of assessing verticality errors as well as vertical and horizontal accelerations at the location of the sensor by appropriate pickoffs from the gyrocompass and accelerometer. Commercially available gyrocompasses, such as the Sperry Mark 19, Mod 3C Meridian gyrocompass, provide the appropriate pickoffs and control voltages for the above-mentioned verticality errors and horizontal accelerations in two orthogonal directions. Vibrating string inertial grade accelerometers having the requisite accuracies for vertical aceleration are also available commercially. One such accelerometer is manufactured by American Bosch Arma. In the present configuration, an American Bosch Arma accelerometer was mounted on the phantom assembly of a standard Navy Sperry gyrocompass without impairing the functioning of either component. The accelerometer, as is common practice, was housed in an oven for temperature control purposes. The outputs of these components were then fed to the processing system described herein.

Referring to FIG. 1, a vibrating string accelerometer 1 is shown connected to a phase-locked frequency multiplier 2. Accelerometer 1 is of the type described above and, in one configuration, had a frequency output $f=62$ Hz./g. where $g$ is the local acceleration in the vertical direction due to the force of gravity. If an accuracy of one part in $10^6$ is desired, using a standard frequency counter, the gravitational force must be measured for greater than $10^4$ seconds, or about three hours. If the frequency of the output of the accelerometer is multiplied by an appropriate factor, the sample time necessary to achieve the desired resolution can be markedly reduced. For this reason, phase-locked frequency multiplier 2 is provided to give an exact multiple of the accelerometer output. The upper limit of the multiplication factor is set by the slew rate imposed by the ship's heave. Phase lock is retained by the present system through heaves of $\pm 1$ g. with a multiplication factor of 128. This would reduce the sample time to approximately 100 seconds when using a standard frequency counter. In the subject invention, the accelerometer output is not sampled but is continuously fed to the counter. No sampling period is set for accumulating data. The multiplication factor does, however, improve the resolution of the system by increasing the frequency of the output to be counted.

The phase-locked output of multiplier 2 forms one of the input signals of difference counter 3. In the ideal case, this signal corresponds to vertical acceleration due to gravitational forces plus accelerations due to the heave of the ship in the vertical direction. The output frequency of the accelerometer $f$ is therefore (1) $\quad f = K_0 + K_1 g + K_1 a_v$ where $K_0$ is the bias term for the accelerometer in a force-free environment and $K_1$ is the scale factor, $g$ is the acceleration due to local gravity and $a_v$ is the acceleration due to heave. The mean frequency $\bar{f}$ of the accelerometer (2) $\quad \bar{f} = K_0 + K_1 g$ since $a_v$ will average out over time. The gravitational acceleration is thus (3) $\quad g = \dfrac{\bar{f} - K_0}{K_1}$ for the ideal case. In practice it is extremely difficult to measure $\bar{f}$ directly; $\bar{f}$ may be generated synthetically and more accurately than by the usual averaging techniques. This is accomplished by the following method.

The approximate means frequency, $f'$, is synthesized by the aforementioned local oscillator shown in FIG. 1 at 4. The mean value $\bar{f}$ is found by adding to $f'$ a signal $\Delta f$ which corresponds to the difference between $f'$ and $f$, the instantaneous output of the acceleratomer. When this is done, $f' + \Delta f = \bar{f}$. It will be appreciated that since the output of the accelerometer, $f$, is multiplied by some constant, M, before processing, the artificially synthesized signal, $f'$, corresponding to the approximate value of $\bar{f}$, must also be multiplied by M.

If a signal is generated having a frequency $f' \approx \bar{f}$ and it is multiplied by M, any instantaneous value $Mf$ from the accelerometer, when subtracted from $Mf'$, will give the change in frequency $M\Delta f$ and, thus, the change in gravitational acceleration $\Delta g$.

To obtain $\Delta f$ instantaneously, both the signal from the multiplier 2 and the signal from a local oscillator or frequency synthesizer 4 are fed to digital difference counter 3 which converts the sinusoidal inputs to digital pulses by the use of Schmidt triggers (not shown) or similar analog to digital converters. The difference of these digital signals is then taken in the conventional manner. The counter runs continuously with no sample period. This running count is transferred to a conventional digital-to-analog converter 5 which converts the digital signal into its analog equivalent. This analog voltage, which corresponds to the total number of difference counts, will be very nearly a straight line as the counter level builds up and will have a slope equal to the difference in frequency between the synthesized signal and the signal from the accelerometer. In actual practice, the counter must be manually returned to zero about twice a day with a counter having a small storage capacity of 15 bits. It will be appreciated that this infrequent resetting obviates the need for either large counters or computer-controlled resetting procedures. There will, however, be variations to the linearity of the line due to unaveraged, vertical accelerations. These variations are substantially removed by passing the output of the digital-to-analog converter 5 through a four-pole active low-pass filter 6. For a six-second period, variations are attenuated by 120 db. This leaves a substantially linear analog signal having a slope equal to $\Delta f$. Differentiating this filtered signal with respect to time by a conventional differentiation network 7 yields the slope and thus $\Delta f$. Adding $\Delta f$ to $f'$ and inserting the appropriate constants yields (4) $\quad \dfrac{f' + \Delta f - K_0}{K_1}$ which gives the local value for $g$. There are, however, errors introduced from primarily three other sources: off-leveling of the accelerometer, fishtailing of the vessel and nonlinear effects in the accelerometer itself. As previously mentioned, by a proper alteration of the output of the frequency synthesizer, these errors can be eliminated.

FIG. 2 shows an analog error computer 10 which controls frequency synthesizer 4 of FIG. 1 to compensate for these errors. The synthesizer output can be varied over a small range by its voltage-controlled oscillator. If the frequency of this oscillator is altered in exactly the same way that the frequency of the accelerometer is altered by errors due to nonlinear effects, fishtail or off-leveling, the difference of the two signals will not reflect these errors.

Taking, as an example, the error due to nonlinear rectification, the actual frequency response of the sensor is (5) $\quad f'' = K_0 + K_1 a + K_2 a_v^2$ where $K_2 a_v^2$ is the nonlinearity term: Assuming $\pm a$ accelerations, the $K_1 a$ term will cancel out over time. The $K_2 a_v^2$ term will not, however, cancel out due to the $a_v^2$ term. This error can be eliminated by adjusting the control voltage and thus the frequency of the synthesizer by that amount proportional to $E_1 = a_v^2$.

Off-leveling errors may be eliminated in the same way. These errors, caused by the actual axis of the accelerometer being offset from the local vertical by an amount $\theta$, are computed as the sum of the products of the gyrocompass follow-up errors and the horizontal accelerations in the N–S and E–W directions. If $A_H$ is the horizontal component of acceleration, the error due to off-leveling $$E_2 = A_H \sin \theta.$$

If $\theta$ is constant, $\pm \theta$ variations will average out over time. If $\theta$ is not constant but is a function of $A_H$, this error may be removed from the system by varying the control voltage of the synthesizer by an amount proportional to $A_H \cdot \theta$ for small off-levelings.

A third type of error which can be removed is that arising from "fishtailing" or variations of the path of the ship along a straight course. This effect occurs in this system as the short term variations in Eötvös effect due to ship's steering error. This error and the corresponding correction voltage may be generated from the output of the gyrocompass, as (6) $\quad E_3 = 2\Omega \cos \phi \Delta V_{EW}(t) \approx 2\Omega \cos \phi V_{NS} \Delta \odot (y)$ where $2\Omega \cos \phi V_{EW}$ = the Eötvös correction
$V_{NS}$ = Ship's N–S velocity relative to the water and
$\Delta \odot (t)$ = deviation of ship's heading w.r.t. the mean course A simple approximation of this error may be derived by multiplying the N–S velocity of the ship by the change in azimuth $\Delta \alpha$. This gives the proper correction voltage for changing the frequency of the synthesizer, i.e., (7) $\quad E_3 = V_{NS} \Delta \alpha$ Both the N–S and the E–W components of $A_H$, respective $\theta$'s, $V_{NS}$ and $\alpha$ can be directly read from the Sperry Mark 19 Mod 3C Meridian gyrocompass, shown as 11 in FIG. 2. Further, the phase-locked frequency multiplier 12 provides a voltage proportional to $a_v$. This allows the nonlinear rectification $K_2 a_v^2$ to be computed. With $A_{NS}$, $\theta_{NS}$; $A_{EW}$, $\theta_{EW}$; $V_{NS}$, $\alpha$; and $a_v$ being supplied by gyrocompass 1 and multiplier 12, the following voltages can be generated:

| | | |
|---|---|---|
| $E_a$ | N–S off-leveling 13 | $A_{NS} \times \theta_{NS}$ |
| $E_b$ | E–W off-leveling 14 | $A_{EW} \times \theta_{EW}$ |
| $E_c$ | Fishtail compensation 15 | $V_{NS} \times \Delta\alpha$ |
| $E_d$ | Nonlinear rectification 16 | $K_2 a_v^2$ |

If the voltages $E_a$ through $E_d$ of 13 through 16 are summed by adder 17 and supplied to the synthesizer, the synthesizer will substantially track the output of the accelerometer due to the above errors. Subtraction of the adjusted signal from the accelerometer signal will thus yield a $\Delta f$, representing only changes in $g$.

It will be appreciated that other error-producing components, such as the temperature drift component of the accelerometer, may also be incorporated into the analog error computer for use in varying the frequency of the synthesizer.

Obviously many modifications and variations of the present invention are possible in the light of the above teachings. It is therefore to be understood that within the scope of the appended claims the invention may be practiced otherwise than as specifically described.

What is claimed is:

1. Apparatus for determining the mean frequency of the sinusoidal output signal produced by a vibrating string accelerometer subjected to a local gravitational field comprising:
   an accelerometer which produces a first signal having a frequency proportional to detected accelerations;
   means for generating a second signal having a frequency which is set close to the mean frequency of the output of said accelerometer;
   means for generating first and second digital signals representing the digital equivalents of the frequencies of said first and second signals;
   means for generating a cumulative digital difference signal from said first and second digital signals;
   means for converting said cumulative digital difference signal into its analog equivalent; and
   means for differentiating said analog signal with respect to time so as to obtain the frequency difference between said first and second signals such that the combination of said differentiated signal with said second signal corresponds to said mean frequency.

2. The apparatus as recited in claim 1 including means for filtering said analog signal to remove from said analog signal any remaining nonlinearities.

3. The apparatus as recited in claim 1 wherein said second signal generating means includes a voltage-controlled oscillator whose voltage is varied so as to vary the set frequency of said generator by an amount equal to that change of frequency of said first signal caused by nongravitational accelerations.

4. The apparatus as recited in claim 3 wherein said apparatus is mounted in a ship and wherein the variation of said voltage is determined by $A_{NS} \times \theta_{NS}$ when said ship is off-leveled in the N–S direction, by $A_{EW} \times \theta_{EW}$ when said ship is off-leveled in the E–W direction, by $V_{NS} \times \Delta\alpha$ when said ship is fishtailing and by $K_2 a_v^2$ due to the nonlinear rectification factor of said accelerometer where $A_{NS}$=ship's acceleration in the N–S direction
$\theta_{NS}$=offset from the local vertical in the N–S direction
$A_{EW}$=ship's acceleration in the E–W direction
$\theta_{EW}$=offset from the local vertical in the E–W direction
$V_{NS}$=ship's N–S velocity
$\Delta\alpha$=change in ship's azimuth
$K_2$=the nonlinearity constant of the accelerometer and
$a_v$=nonlinear acceleration component 5. A system for determining local gravitational fields at sea from aboard a ship comprising:
   a gyroscope, having a phantom assembly, mounted in said ship;
   a vibrating string accelerometer mounted on said phantom assembly such that the vertical axis of said gyroscope corresponds to the axis of detection of said accelerometer,
      said accelerometer having an output frequency proportional to the vertical component of said local gravitational field;
   a phase-locked frequency multiplier fed by said accelerometer output for multiplying the frequency of said output by a predetermined amount;
   as oscillator tuned to a multiple of a frequency close to the mean frequency of said accelerometer;
   said multiple being the same multiple as that of said phase-locked frequency multiplier;
   a difference counter fed by the outputs of said multiplier and said oscillator for deriving the digital difference between said outputs;
   means for converting said digital difference into its analog equivalent and for producing a corresponding analog signal;
   means for filtering said analog signal so as to remove any nonlinearities in said signal;
   means for differentiating said filtered signal with respect to time; and
   means for recording said differentiated signal such that said recorded signal represents the frequency difference between the multiplied output of said accelerometer and the output of said oscillator, whereby the sum of said frequency difference and the output of said oscillator is proportional to the vertical component of said local gravitational field.

References Cited

UNITED STATES PATENTS

| 2,595,092 | 4/1952 | Mounce | 73—382 |
| 3,005,348 | 10/1961 | Perkins et al. | 73—517 |

JAMES J. GILL, Primary Examiner

U.S. Cl. X.R.

73—517